W. R. Palmer.
Thrashing Mach.
No. 8,744.     Patented Feb. 17, 1852.
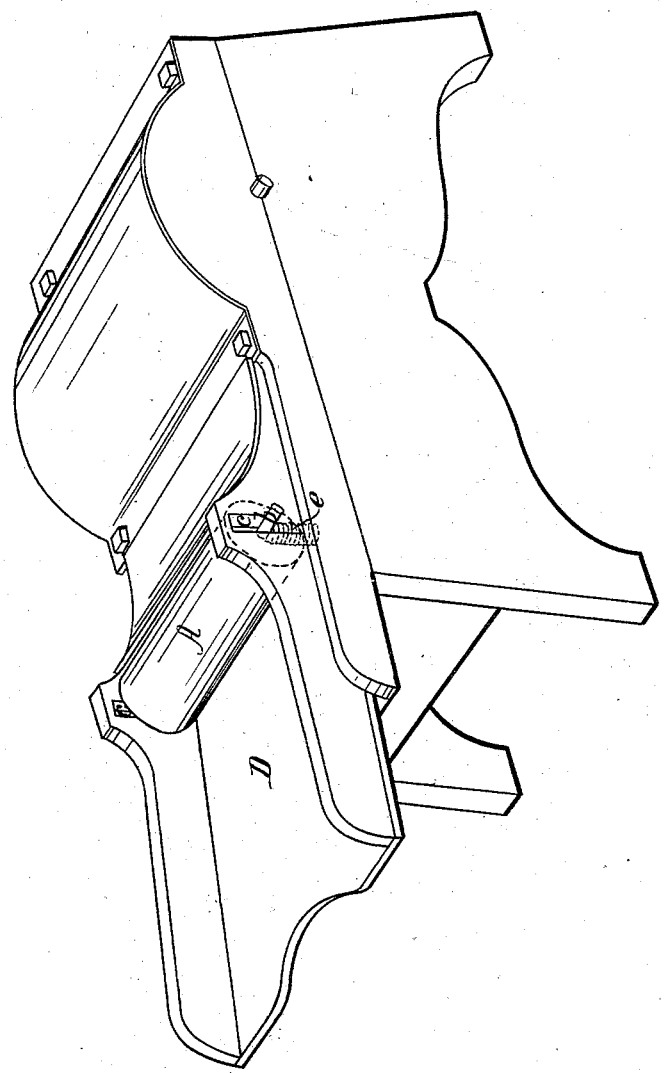

UNITED STATES PATENT OFFICE.

WILLIAM R. PALMER, OF ELIZABETH CITY, NORTH CAROLINA.

FEEDING APPARATUS FOR GRAIN-THRESHERS.

Specification of Letters Patent No. 8,744, dated February 17, 1852.

*To all whom it may concern:*

Be it known that I, WILLIAM R. PALMER, of Elizabeth City, in the county of Pasquotank and State of North Carolina, have invented a new and useful Improvement in Machines for Threshing Grain, of which the following is a full, clear, and exact description, reference being had to the accompanying drawing, which represents a view in perspective of a cylinder threshing-machine with my improvement applied thereto.

It is well known that serious and often fatal accidents occur to those who feed the grain to threshing machines. These accidents are mainly of two kinds, those which result from the hands and arms being drawn in between the cylinder and concave and being torn and lacerated by the teeth, and those which result from the projection of loose or broken teeth from the cylinder, which fly with such velocity that they have been known to cause the death of the feeder almost the instant they struck him.

To prevent these accidents is the object of my invention which consists of a guard or screen roller which is applicable to threshing machines generally, and which both prevents the hands of the feeder from reaching the teeth of the cylinder, and also intercepts and arrests any loose or broken teeth that may fly off.

The guard attached to the machine represented in the annexed drawing consists of a roller A of wood or other suitable material, whose gudgeons $b$ are constructed to turn in slots $c$ formed in the sides of a supplementary feed board D which is secured upon the ordinary feed board of the machine; these slots are at such a distance from the surface of the threshing cylinder that a man cannot touch the teeth by inserting his hand and arm beneath the roller guard A, for the latter cannot rise sufficiently to allow his shoulder and body to pass beneath it. The gudgeons of this roller are supported by springs $e$, which are of such strength that they nearly counterbalance its weight; hence the roller will rise with ease by shoving the grain beneath it and will not oppose an obstacle to the feeding of the machine; but it will also run upon the grain and thus closing the throat of the threshing machine will intercept any loose or broken tooth which may be thrown out by the cylinder, and will thus shield the feeder from injury.

This guard is peculiarly applicable to threshing machines used in the Southern States, as the negroes are proverbially careless and are frequently injured by getting their hands in the machine, an accident which cannot occur when this guard is employed, for even if a person was reckless enough to attempt to touch the threshing teeth, the guard would prevent his so doing.

The arrangement and construction of guard I have represented and described is that which I deem most suitable to accomplish the objects required, but it is evident that its construction and arrangement may be modified and varied without affecting the principle of the invention, provided only that it prevents the attendant from touching of the threshing teeth and intercepts the broken or loose teeth thrown off by the movement of the cylinder.

What I claim as my invention and desire to secure by Letters Patent is—

The method herein described of preventing accidents to the feeder of a threshing machine by interposing between him and the cylinder a roller or the equivalent thereof which is arranged across the throat of the machine and is supported and guided substantially in the manner and for the purpose herein set forth.

In testimony whereof I have hereunto subscribed my name.

WM. R. PALMER.

Witnesses:
E. S. RENWICK,
P. H. WATSON.